Oct. 17, 1961   C. MARRET ET AL   3,004,350
RADIO AIDS SIMULATOR FOR SIMULATED FLIGHT TRAINING
Filed May 28, 1958
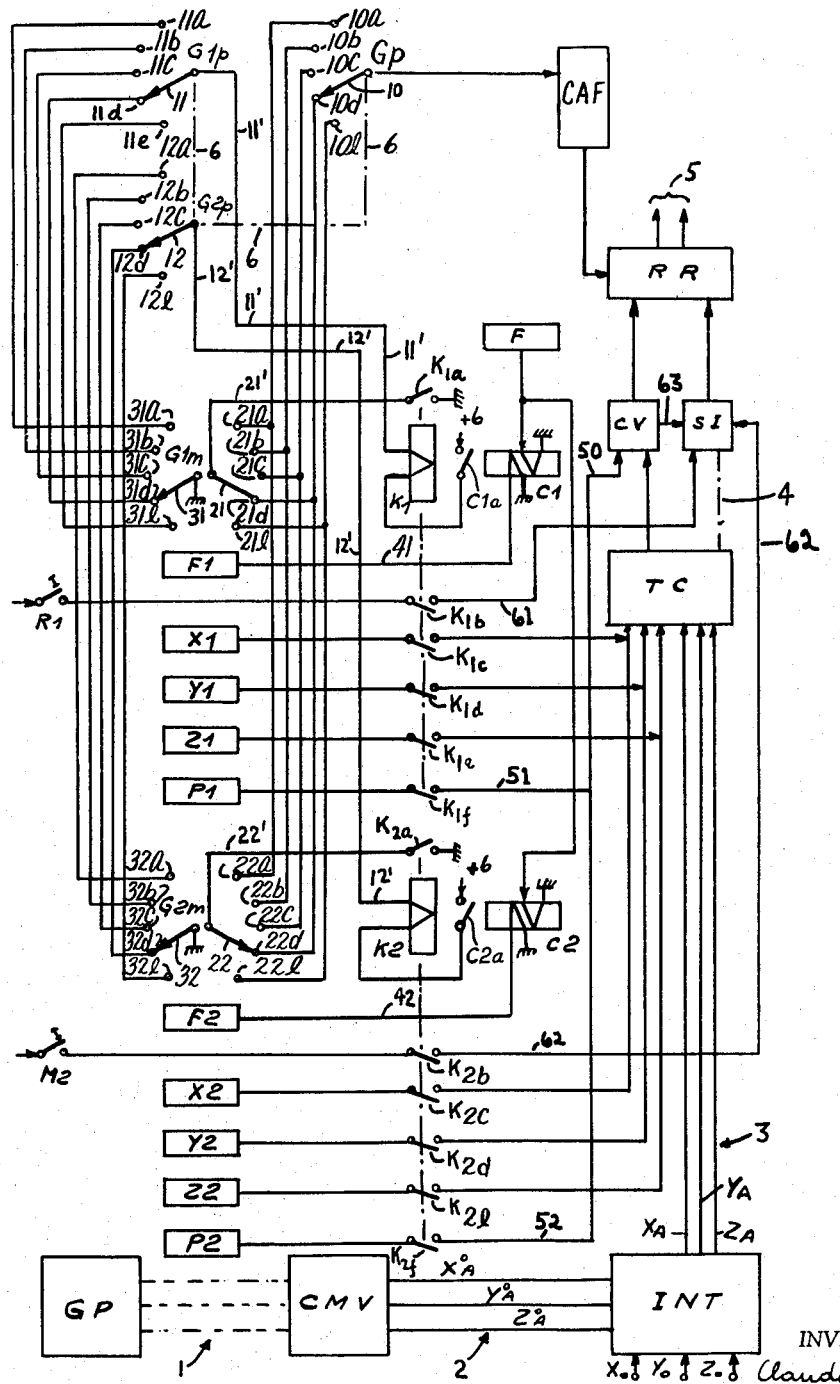
INVENTORS
Claude Marret
Jean Armanville
BY
Norbert Ederer
their attorney 3,004,350
RADIO AIDS SIMULATOR FOR SIMULATED FLIGHT TRAINING
Claude Marret and Jean Armanville, Paris, France, assignors, by mesne assignments, to Curtiss-Wright Corporation, a corporation of Delaware
Filed May 28, 1958, Ser. No. 738,400
Claims priority, application France May 29, 1957
3 Claims. (Cl. 35—10.2)

This invention relates to ground based flight simulating apparatus for the training of aircraft crews, and more particularly to training apparatus for the instruction of radio navigational aids.

In actual practice as distinguished from the simulation thereof, radio aids signals are transmitted from stations that are scattered over the territory they control. The location of each station may be identified by its geographical coordinates, for example a North-South coordinate $X_1$, an East-West coordinate $Y_1$ and an altitude coordinate $Z_1$. Each station transmits radio frequency signals at an assigned carrier frequency and the carrier is modulated by intelligence signals, both particular to such station and common to the stations transmitting within the same frequency band.

The airplane is provided with a multi-band tuneable receiver. The pilot tunes in the frequency of the station he intends to use for navigational aid the position of which he approximately knows from the flight schedule. The reeciver delivers radio aids signal both visual and aural, from which the pilot may determine the bearing of the plane relative to the station, the distance therefrom, the instant location of the flight with especially high precision when in proximity to the airport, etc.

In the simulator the direction coordinates of the fictitious airplane are normally given by a computer which solves the simulated flight equations and receives information from the primary controls i.e. stick and pedals. This computer delivers continuously and usually in the form of analog voltages the instant speed parameters of the fictitious airplane $\dot{X}_A$, $\dot{Y}_A$ and $\dot{Z}_A$, and these voltages are applied respectively to the inputs of electrical integrators constituting a second computer. Voltages proportional to the analog values of the initial coordinates $X_0$, $Y_0$ and $Z_0$ are set at the start of the training mission and are also applied to respective integrators. These initial coordinates define the starting point of the plane for this mission. From the output of this second computer there are obtained generally in the form of analog voltages and on a continuous basis the three instant coordinates for the fictitious airplane, North-South being $X_A$, East-West being $Y_A$, and altitude being $Z_A$.

The flight crew in training "tunes" in the proper simulated receiver on the proper frequency range and on the exact frequency of the desired station. Automatic means interpret the "tuning" operation to activate the signal receiver. This implies not only the automatic actuation of the simulated signals for the station "called" but also the automatic correlation of the distance co-ordinate signals of the simulated flight with the distance between the fictitious airplane and the simulated radio aids and generation of the radio aid signals in accord with these distances. This implies therefore that the position of the plane with regard to station "called" is computed automatically in the simulator.

Simulating apparatus of the described character is known in the art; it is the principal object of this invention to accomplish the realization of this group of conditions through a radio aids simulator simple and economical to use. Simulating apparatus according to the present invention is characterized in that the signal receiver is associated with but a single computer common to all stations which determines the relative position of the fictitious plane and the fictitious station called by the pilot on the receiver. Apparatus in accord with prior art had required one such computer for each station. The "tuning" operation actuates an automatic selector which selects the desired station from the available group of stations. Each station is simulated by a set of indicators presenting its geographical coordinates and its radio characteristics. This selection results first in applying the geographical coordinates on the computer and second applying the radio signals simulating this station through the control signals of the output of the computer under the control of the receiver circuits corresponding to the selected tuning frequency.

The aforementioned selection is accomplished under the condition of a double coincidence of frequency and band of frequencies of the pilot's receiver and of the station. This double coincidence additionally removes an inhibition previously applied to the receiver under conditions of absence of such double coincidence. The invention extends to the case where the selection is done through a systematical sequential test of this double intercorrespondence of the established frequencies available at the pilot's receiver and the simulated stations available for call during the training mission at any given instant.

The invention will be more fully understood from the following more detailed description referring to the accompanying drawing, the single figure of which is a schematic illustration of radio navigational simulating apparatus in accordance with a preferred embodiment of the invention.

For the sake of simplicity the drawing shows only two simulated stations, but as will be apparent a great number of stations can be added. The "block diagram" form has been chosen for simulator components well known in the art in order to simplify the drawing and the description of such components.

Referring to the drawing, primary student operated simulated flight controls and instructor controls contained within the unit GP deliver electrical and/or mechanical signals to a flight computer CMV over connections generally indicated collectively at at 1. The computer CMV computes the instant Cartesian velocity components of the instant flight $X_A$, $Y_A$ and $Z_A$ in the form of electrical signals, generally analog voltages, to a set of integrators INT over lines indicated collectively as 2.

The integrators INT also receive voltages representative of the initial coordinates $X_0$, $Y_0$ and $Z_0$ which are preset at the beginning of the training mission. The integrators deliver three analog voltages which define at any time the coordinates $X_A$, $Y_A$ and $Z_A$ of the fictitious airplane to three inputs of a computer TC over lines indicated collectively as 3. Computer TC, as explained below also receives a set of input analog voltages representing the Cartesian coordinates of the selected radio station.

Responsive to its input signals computer TC delivers output signals representative of the instant relative locations of the simulated flight and of the selected radio station in polar form rather than Cartesian form. More particularly it delivers to a volume control CV associated with the receiving system a voltage proportional to the computed distance between the fictitious airplane and the fictitious station. It also delivers to a computing system SI also associated with the receiving system a signal, generally a mechanical one in the form of a shaft position as indicated by mechanical connection 4.

The CV unit also receives over line 50, as will be seen hereinafter, an analog voltage defining the maximum range of transmission of the "called" station. This signal is compared with the signal derived from computer TC, and the difference signal is applied to the receiver RR proper to serve as intensity control for aural and some visual signals. If conditions are such the simulated flight is beyond such transmission range the receiver RR will be silent even though properly tuned to the "called" station.

System SI responsive to the TC input signal and to another special input signal applied over line 61 or 62 and described hereinafter, computes bearing information for other plots of the fictitious station as seen from the fictitious airplane and actuates suitable indicating means (not shown) that display the computed information visually. It is provided with as many automatic indicators as there are available stations. An indicator is actuated by the special signal at a level controlled by the setting of the CV volume control circuits. In addition the SI system contains also a control for the marker, beacon, DME, A—N, ILS and other secondary signals. This control (not shown) is energized by a signal typical for the selected station band. This signal is remotely generated and controlled by the variable "plotting" from the output of TC. This is generally accomplished by a mechanical device on the shafts of a dual attenuator (one attenuator for each type of signal). The attenuation varies to produce intensity variations on either side of the maximum intensity of the radio beam. The SI system also receives over line 63 a control signal from the CV system effective to inhibit display of visual indication when the flight is outside of the broadcast range of the selected station.

The simulating apparatus so far described is well known in the art and for this reason the description has been in brief summary form. The apparatus incorporates further elements also well known; these are a radio frequency multi-position band selector switch $G_p$, a continuously positionable fine tuning control F, instructor controlled potentiometers $F_1$, $X_1$, $Y_1$, $Z_1$ and $P_1$ and like-lettered potentiometers with subscript numeral 2 and control switches $R_1$ and $M_2$ the functioning of which will be explained hereinafter. The receiver RR is provided with outgoing lines 5 that lead to the usual pilot's earphones.

In the following description it is assumed by way of example that the receiver RR is tunable in five frequency bands designated as $a$ through $e$, and that, also by way of example, there are available but two radio stations transmitting radio aids signals, both lying in the same band $d$. The manner in which the concept of the invention can be readily extended to more frequency bands and more stations within a given band will be readily apparent hereinafter.

The receiver RR is provided with a band selector switch $G_p$ actuable by the student, which in turn is provided with a moveable contact 10 that is adapted to engage a series of stationary contacts 10a through 10e that are associated with the bands $a$ through $e$ respectively. Consistent with the previous assumption the contact 10 is shown to engage the stationary contact 10d to represent selection of band $d$.

Ganged together for switching in unison, as indicated by the mechanical connections 6, are a plurality of auxiliary moveable contacts the number of which is generally equal to the number of available stations in the particular band having the most such available stations. In the present instance it has been assumed that two stations are available in band $d$ and no stations in any of the other bands. Therefore merely two auxiliary moveable contacts 11 and 12 are indicated. If for example, there had been available three stations in band $b$ in addition to the two stations in the band $d$, a third auxiliary moveable contact would have been required. The contacts 11 and 12 are switchable in unison with the contact 10 to engage respective stationary contacts 11a through 11e and 12a through 12e in literal correspondence with the contact 10. In view of the assumption of the selection of the band $d$ the contacts 11 and 12 connect to the stationary contacts 11d and 12d respectively. The latter two contacts are associated with the two available stations in band $d$. If for example two stations in the band $a$ were additionally available, the contacts 11a and 12a would serve to control and would be associated with such stations in the band $a$. The illustrated arrangement is thus capable of controlling ten stations, two each in the five bands $a$ through $e$. However, as indicated before, stations are available in the band $d$ only and the number thereof is two.

For each of the wafers $G_{1p}$ and $G_{2p}$ (and any added ones where required) there is provided a corresponding wafer $G_{1m}$ and $G_{2m}$ (and further ones as required to match the number of student controlled auxiliary wafers). The wafers $G_{1m}$ and $G_{2m}$ are of the double pole type having two moveable contacts 21 and 31, and 22 and 32 respectively. The contacts 21 and 31 are positionable in unison by the instructor to engage simultaneously corresponding stationary contacts of the series 21a through 21e and 31a through 31e, in accordance with the preselection of a given band at the commencement of the training exercise. The wafer $G_{2m}$ is similarly constructed as indicated by correspondence of reference numerals and letters. Consistent with the previous assumption only the contact pairs 21d and 31d, and 22d and 32d are used ("live"), whereas the remaining contacts of their respective series are unused ("dead").

As illustrated the contacts in the group 10a through 10e are connected respectively to the two like-lettered contacts in the series 21a through 21e, and 22a through 22e. Further, the contacts in the series 11a through 11e are connected respectively to like-lettered contacts in the series 31a through 31e, whereas the contacts in the series 12a through 12e are connected respectively to like-lettered ones in the series 32a through 32e. The pattern for any additional wafers is readily apparent and requires no further description.

The moveable contacts 31 and 32 are grounded, the moveable contacts 11 and 12 are connected to coils of relays K1 and K2 through lines 11' and 12' respectively, whereas the moveable contact 10 is connected to a receiver tuning control circuit CAF which per se is well known and forms no part of the present invention and is therefore illustrated in block form. The moveable contacts 21 and 22 are connected to moveable K1a and K2a contacts of the relays K1 and K2 respectively over lines 21' and 22'. Were a further instructor controlled wafer provided, its two moveable contacts would be connected to a further relay and a moveable contact thereof respectively.

Associated with each of the pairs of the live contacts of the switches $G1m$, $G2m$ etc., that is with each of the radio aids station under contemplation, is a set of five potentiometers designated respectively as $F_1$, $X_1$, $Y_1$, $Z_1$, $P_1$, and $F_2$, $X_2$, $Y_2$, $Z_2$, $P_2$, etc. The set of potentiometers associated with the switch $G2m$, and for that matter the sets of any further instructor controlled switches are exactly analogous, and for this reason only the set associated with the switch $G1m$ need be discussed in detail.

The potentiometers are suitably energized and are preset by the instructor at the beginning of the training mission to derive voltages representing the following characteristics of the associated radio stations: $F_1$—transmitting frequency; $X_1$, $Y_1$, $Z_1$ geographical coordinates of the stations; $P_1$—maximum transmission range of the station.

The $F_1$ voltage is routed over line 41 through one coil of a two coil differential relay C1 to ground. The other coil of relay C1 is grounded at one end and at its other end is energized by a voltage derived from the potentiometer F that is operable by the student pilot in his "tuning" of the receiver RR. This derived voltage is also applied to a corresponding coil of a relay C2, the other coil of which is energized by the voltage derived from the potentiometer F2 over line 42. In the case of additional stations further differential relays similar to C1 and C2 would be provided and all such relays would have one coil energized by the voltage derived from the potentiometer F. This F derived voltage is variable in accordance with the setting of the potentiometer F, i.e. with "tuning." The differential relays have the property that when the currents through the two coils of a given relay are approximately equal, the relay is deenergized and is otherwise energized. Assuming that the student has tuned in frequency F1 the winding currents of the relay C1 will be equal, the relay will be deenergized, its associated contact C1a will close, and an energization circuit for the relay K1 will be completed. This energization circuit extends from the voltage source +6 over contact C1a, the relay coil, line 11' contacts 11, 11d, 31d, 31 to ground. This of course presupposes that the student has selected the proper band d, for if he had not the connection from contact 11 to contact 31 would be broken. Energization of a K relay thus requires the double coincidence of matching of the bands and matching of frequencies.

Energization of relay K1 closes its previously opened contacts K1a through K1f. Closure of the contact K1a completes a previously open ground return to the tuning control circuitry CAF which circuit extends from ground over contacts K1a, 21, 21d and 10d. The open state of such circuit, assuming that the corresponding parallel paths through contact K2a and any further similar contacts had also been open, had previously blocked operation of the receiver RR. The completion of a ground return removes this inhibition so that the receiver is free to operate provided the simulated flight is within the maximum transmission range of the selected radio station tuned in. The latter condition is verified and also the receiver signal strength is adjusted in accordance with the distance from the station by the introduction of the X1, Y1 and Z1 voltages over the now closed contacts K1c, K1d, and K1e respectively to the coordinate converting computer TC and that of the P1 voltage over the now closed contact K1f and lines 51 and 50 to the volume control CV. Computer TC compares the station coordinate voltages with the coordinates of the simulated flight received over lines 3 and delivers to the volume control CV a signal representative of the instant distance of the simulated flight from the station. This voltage delivered to the volume control CV is compared with the P1 voltage also delivered thereto to control the receiver signal intensity; if the flight-to-station distance exceeds the maximum transmission distance P1 the receiver will not deliver any perceptible signals, such as the audio signals.

Assuming that the student pilot wishes to tune in another station also on band d, say the station represented by the switch G2m and associated circuitry, as he begins to operate the tuning control F the currents through the coils of relay C1 will be more and more unequal in accordance with the detuning. The relay C1 will not be energized however, until the inequality is sufficient for de-energization. In this manner the relatively broad tuning effect of operation of the fine tuning control F is simulated. When relay C1 ultimately is energized, relay K1 will be deenergized, the ground connection of circuitry CAF will be broken and the receiver RR will once more be inhibited. At the same time application of the voltages through the remaining contacts of relay K1 will be discontinued. When the station represented by switch G2m and associated circuitry is arrived at, relay C2 will be deenergized and relay K2 will be energized, the receiver RR will once more be enabled and a similar set of events will occur.

If instead of shifting from one station to a second station on the same brand d the student pilot intended to shift to a station on another band, say band c, he would operate the band control switch $G_p$. In such case the ground return for circuitry CAF would be broken instantly causing an immediate inhibition of the receiver RR in simulation of operation of the band selector switch in an actual aircraft. It is apparent that upon switching to the new band c, a new ground return for circuitry CAF could not be established instantaneously; this requires first deenergization of a C relay and second energization of the associated K relay.

The description so far has considered the function of the a and of the c through f contacts of the K relays but not of the b contacts thereof. These contacts complete circuits to the system SI for application thereto of respective AN range, omni-directional, marker, beacon etc. signals associated with the particular selected station, and applied thereto over the instructor controlled switch R1, contact K1b and line 61, the instructor controlled switch M2, contact K2b and line 62, etc. Suitable bearing signals, for example, may be displayed on receiver RR in accordance with the particular signal introduced to the system SI, and the indication is of course controlled in accordance with the instant location of the simulated flight relative to he selected station to reflect indication in terms of relative locations of the flight and station. This is accomplished by means of the control exercised on the system SI by the computer TC through the agency of the connections 4.

It should be understood in the preceding description that the "station" and "receiver" do not operate at radio frequencies; as is usual in the case of flight simulating apparatus operation is at line frequency or direct voltage.

It should be further understood that this invention is not limited to specific details of construction and arrangement thereof herein illustrated, and that changes and modifications may occur to one skilled in the art without departing from the spirit of the invention.

What is claimed is:

1. Apparatus for the training of flight crews in radio navigational aids comprising means for computing the instant location of the simulated flight, instructor controlled means providing signals representing the geographical location and the transmitting frequency and further providing navigational aid signals of each of a plurality of simulated radio aid transmitting stations, a simulated radio receiver tunable by a student on said stations, a single computer common to all said stations and adapted to compute the instant location of said simulated flight relative to any one of said stations and coincidence circuit means responsive to tuning in by said student of said receiver on any desired one of said stations for operatively connecting the means for representing the geographical location and navigational aid signals of such desired station to said signal computer and receiver respectively to effect control of said receiver by said signal computer and cause said receiver to deliver the navigational aid signals of said desired station in accordance with the computed distance of the simulated flight relative to said desired station, the receiver being provided with a student operated band selector switch, with the inclusion of a corresponding instructor operated band selector switch for selection of bands wherein the radio stations lie, and means responsive to matching of instructor and student band selections for enabling the receiver to operate and otherwise for inhibiting said operation, the receiver being tunable on a continuous basis as distinguished from selector switch tuning and the coincidence circuit means being responsive to double coincidence of matching of instructor and student band selections and of tuning in the desired station in the matched selected band to effect the aforesaid operative connections of the geographical location and navigational aid signals representative means.

2. Apparatus according to claim 1 wherein the coincidence circuit means includes relay means associated with each available radio station and provided with a plurality of contacts switchable responsive to the aforesaid double coincidence to effect the aforesaid operative connections of the geographical location and navigational aid signals representative means, said relay means being effective to maintain said contacts in the switching state to effect said connections even on detuning from a given available station in the broadcast band thereof to simulate broad band tuning, while responsive to band switching said contacts are instantly transferred from said state for instant disconnection of the geographical location and navigational aid signals in simulation of instant receiver silence on band switching.

3. Apparatus according to claim 2, with the inclusion of instructor controlled means providing respective signals representative of the maximum broadcast range of each available station, being respectively switchable on the aforesaid double coincidence to the computer of the instant location of the simulated flight relative to the corresponding tuned in station through respective contacts of the relay means, and means comparing the instant location signal with the appropriate maximum broadcast range signal for suppressing perception of navigational aid signals when the flight is outside of said appropriate broadcast range even though the receiver is properly tuned in on the appropriate station.

References Cited in the file of this patent

UNITED STATES PATENTS

| | | |
|---|---|---|
| Re. 23,627 | Dehmel | Mar. 10, 1953 |
| 2,529,468 | Dehmel | Nov. 7, 1950 |
| 2,685,747 | Hicken | Aug. 10, 1954 |